United States Patent [19]

Gabr

[11] 4,260,163
[45] Apr. 7, 1981

[54] PHONOGRAPHIC SOURCE

[75] Inventor: Saad Z. M. Gabr, Canterbury, England

[73] Assignee: A.R.D. Technical Assistance and Engineering Services International Anstalt, Vaduz, Liechtenstein

[21] Appl. No.: 147,756

[22] Filed: May 8, 1980

Related U.S. Application Data

[63] Continuation of Ser. No. 962,030, Nov. 15, 1978, abandoned.

[51] Int. Cl.³ .............................................. G11B 3/60
[52] U.S. Cl. .................................... 369/266; 369/251; 369/270; 369/271
[58] Field of Search ............................ 274/39 A, 39 R

[56] References Cited

U.S. PATENT DOCUMENTS

| 1,245,568 | 11/1917 | Collins | 274/39 R |
| 1,360,900 | 11/1920 | Davis | 274/39 R |
| 1,641,136 | 8/1927 | Dorn | 274/1 K |
| 3,815,924 | 6/1974 | Hasselbach | 274/23 R |

FOREIGN PATENT DOCUMENTS

| 2547849 | 6/1976 | Fed. Rep. of Germany | 274/39 A |
| 703177 | 4/1931 | France | 274/39 R |
| 228005 | 1/1925 | United Kingdom | 274/39 R |
| 336794 | 10/1930 | United Kingdom | 274/39 R |
| 416419 | 10/1934 | United Kingdom | 274/1 K |

*Primary Examiner*—John W. Shepperd
*Attorney, Agent, or Firm*—Young & Thompson

[57] ABSTRACT

A phonographic source has a turntable with a central hub joined by radial arms to a peripheral rim in which the weight of the turntable is concentrated so as to expose at least a major part of the underside of a record supported on the turntable. The record is supported at the hub, and by the arms and/or the rim, and in a modification by one or more concentric rings. The central spindle of the turntable for reception in the record center hole can be connected to the turntable drive shaft only indirectly, by a further construction in which the drive shaft connects with a lower turntable member connected with an upper turntable member for supporting the record by a concentric ring between the members. The source can include a pick-up arm having a counter-balance portion extending from the front position away from the portion carrying the cartridge, which counterbalance portion has at least approximately the shape of the other portion.

3 Claims, 6 Drawing Figures

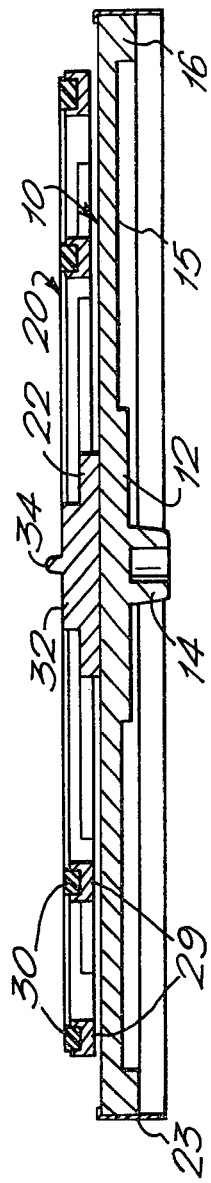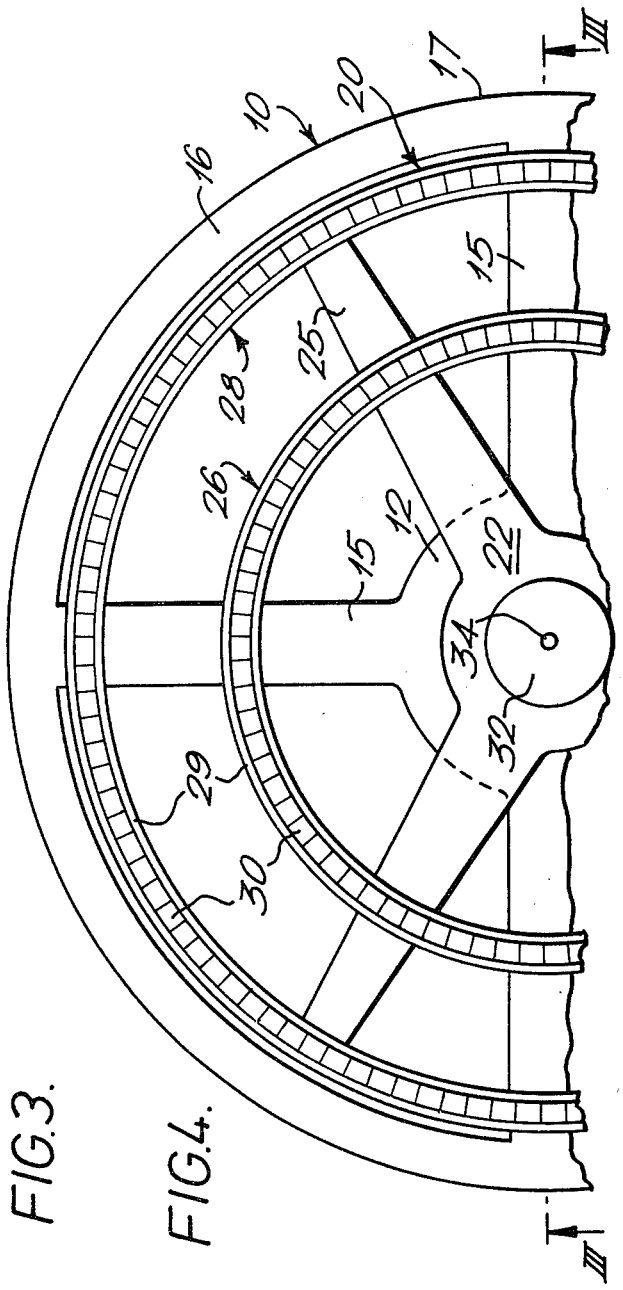

PHONOGRAPHIC SOURCE

This is a continuation, of application Ser. No. 962,030, filed Nov. 15, 1978 now abandoned.

The invention relates to a phonographic source, or record playing deck, and is concerned in particular with a turntable and a pick-up arm for such a source capable of eliminating or reducing unwanted contributions to the pick-up output due to motor noise and airborne vibrations, including sound vibrations from loudspeakers incorporated in the same sound reproduction system as the phonographic source.

Sound reproduction systems employing conventional record playing devices suffer from acoustic feedback effects due to the tendency of the turntable or platter, on which a record rests when being played, to act as a sound responsive diaphragm. Speed regulation also presents a problem unless a rather heavy platter is employed, but this adds to production costs not only in respect of the platter itself but in respect of the associated drive motor also.

Accordingly the invention provides a phonograph turntable comprising a hub, an outer rim and means extending therebetween, the turntable having the major part of the weight thereof in the rim and being shaped to expose at least a major part of the undersurface of a record received thereon.

Also according to the invention, there is provided a phonograph turntable comprising a lower member arranged to be mounted on a drive means for the turntable, an upper member arranged to support a record to be played so as to expose at least a major portion of the lower surface thereof and providing a spindle for reception in the centre hole of such a record, the upper and lower members being connected together without direct connection between the drive shaft and the spindle.

Preferably the upper member comprises a plurality of arms radiating outwardly from a central hub mounting the spindle, and a plurality of concentric rings providing record-engaging surfaces.

Thus the motor drive shaft can be physically separated from the spindle on which the record is received to minimise the transfer of motor vibrations to the record. The concentric rings can provide continuous or substantially continuous support for the record, whilst at the same time exposing at least a major portion of the area of the underside of the record to the same airborne vibrations as are experienced by its upper surface.

The invention can accordingly provide a phonographic source and parts therefor whereby reduced acoustic feedback is achieved by arranging for exposure of both major surfaces of a record to be played to ambient acoustic pressures, whereby the cost of turntable production is reduced, together with related costs, by concentration of the greater part of the mass of the turntable at the extreme periphery to achieve optimum regulation together with minimum weight, and whereby the transfer of drive motor vibrations to the record and thus to the pick-up arm is substantially reduced.

Also according to the invention, there is provided a pick-up arm for a phonographic source, the arm comprising a first portion extending from a pivot mounting position to means for carrying a pick-up cartridge, and a second, counter balance, portion extending from the pivot position away from the first portion, the second portion being of a shape which at least approaches that of the first portion.

In such a pick-up, the effect on the pick-up output of imposed vibrations, other than the vibrations of the stylus, whether carried through the mounting structure of the pick-up arm or through the air, is minimised. Although ideally the pick-up arm should have symmetry on either side of the pivot position, space requirements will normally impose a deviation from this ideal, and the pick-up arm embodying the invention will therefore have a portion extending beyond the pivot position away from the cartridge, the length of which is at least one third of the total length of the arm.

The invention will be more readily understood from the following illustrative description and accompanying drawings, in which:

FIG. 3 is a sectional side view of a second phonographic turntable embodying the invention, taken on the line III—III of FIG. 4;

FIG. 4 is a partial plan view of the turntable of FIG. 3;

Figure 1:
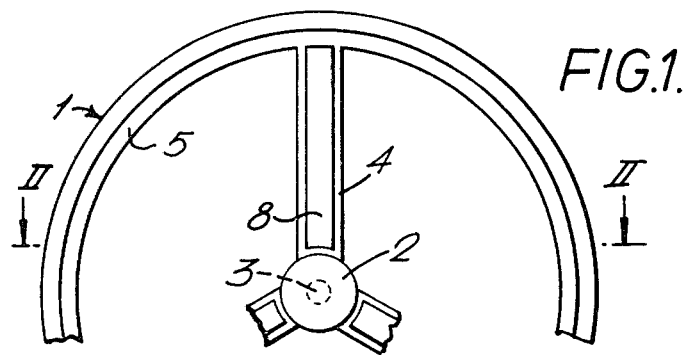
FIG. 1 is a partial plan view of a first turntable embodying the invention.

The first embodiment of the invention, shown in FIG. 1, comprises a turntable 1 having the general form of a cartwheel, with a hub 2 from which at least three arms or spokes 4 extend radially to a rim 5. The hub 2 is is provided with a central aperture or recess 3 for reception therein of the upper end of a vertical motor drive shaft. The connection may be frictional or by form-fitting of the shaft into the aperture or recess, but any suitable connection can be employed. Preferably, the free upper end of the motor drive shaft is not arranged to enter the centre hole of a phonographic record being played, but a separate spindle is provided for this purpose, and the path by which mechanical vibrations from the drive shaft can be conveyed to the spindle is made as long as possible by dividing the hub into upper and lower members connected together remotely from the turntable axis.

A record to be played is arranged to be supported for the most part on the spokes 4 which are formed as upwardly open channel members in which strips 8 of rubber or plastics material are received; these strips provide the actual record-engaging surfaces. The outer edge of the hub 2 provides support near the inner edge of the record and the inner edge of the rim 5 can be arranged to provide peripheral support for a record of standard size instead of or in addition to the support provided by the spokes.

The major weight of the turntable 1 is concentrated in the rim 5, the hub 2 and the spokes 4 consisting of no more material than is necessary to maintain the necessary rigidity of the turntable structure. The rim 5 may have any suitable shape but preferably provides a vertical, horizontal or inclined surface on which stroboscopic markings can be displayed; a separate skirt portion carrying such markings can be provided instead if preferred.

The phonographic turntable shown in FIGS. 3 and 4 comprises a lower member 10 which functions primarily as a flywheel, and an upper member 20 for supporting a phonographic record or disc to be played. The lower, flywheel, member 10 comprises a central hub 12 with a downwardly extending boss 14 with a central recess into which the upper end of the motor drive shaft is received, the fit being sufficiently close for the rotation of the drive shaft to be transferred to the hub. A plurality of spokes 15 extend radially outwardly from the hub to a ring 16 in which the weight of the flywheel element 10 is concentrated. There may be any suitable number of the spokes 15, normally not less than three. The flywheel element can have any suitable diameter, for example one exceeding the diameter of the upper member 20 as shown, or corresponding at least approximately to this diameter.

The upper member 20 again comprises a central hub 22, the lower surface of which is connected to the top of the lower lub 12. A plurality of arms 25, again normally not less than three in number, extend radially outwardly from the hub 27, their lower surface being spaced above the lower member 10. The arms 25 carry a plurality of annular support members 26, 28 which effect supporting engagement with the underside of a record to be played. The annular support members 26, 28 each comprise an annular channel member 29 within which is received a ring 30 of rubber or like resilient material, having a flat upper surface above the side walls of the channel member. The outer diameter of the outer support member 28 is preferably such as to provide support very near the outer edge of a standard diameter record and the inner member 26 can have a similar relation to a smaller diameter record.

At the centre of the hub 22 there is provided a raised portion 32 from which there upwardly protrudes a spindle 34 for reception in the centre hole of the record. The upper face of the portion 32 provides a record engaging surface for support of the record centrally.

It will be evident that the turntable structure described severely limits the possibility of transfer of motor vibrations to a record which the turntable supports. Such vibrations must travel from the motor drive shaft through the flywheel member hub 12 and through the upper member hub 27 before reaching the record. This path ensures very considerable attenuations of such vibrtions, and their virtual elimination as compared with an arrangement in which the spindle received in the record centre hole is actually a continuation of the motor drive shaft. The adjacent surfaces of the flywheel member 10 and the overlying support member 20 preferably have non-reflective sound surfaces, so as to limit the transfer of sound vibrations between them.

The turntable structure can be constructed in any suitable materials; the flywheel member 10 is preferably a cast metal member as may be the hub, arms and channel members of the member 20. Adequate inertia however can be provided by a flywheel member 10, so the member 20 can be of plastics material or otherwise made as light as is consistent with sufficient rigidity to provide adequate support.

The structure illustrated can of course be varied in many ways, in particular as regards the number of the arms and spokes, and the number and spacing of the annular support members. The annular channel members 29 in which the support rings 30 are carried and the support area of the rings themselves in any event represent only a minor part of the record undersurface area, so that there is adequate cancellation of sound or other vibrations incident upon the exposed upper surface of the record, by the incidence of such vibrations on the undersurface also.

In one modification, an annular channel member which is radially relatively broad is provided, and this receives an insert having at its inner and outer peripheries raised portions, either continuous or nearly continuous, which provide the actual support rings. In order to reduce the area of the underside of the record which is covered by such a channel member, the channel member and the insert are provided with apertures of the greatest possible total area consistent with adequate strength.

The ring 16 can be provided with stroboscopic marking either on the cylindrical surface 17 or on the upper annular surface extending beyond the upper member 20. Instead, the ring 16 can be shaped to have a surface inclined to the turntable axis to carry such markings. Alternatively a stroboscopic ring element 23 can be provided for attachment to the lower member 10 as shown in FIG. 3 only. Such a ring element is preferably a simple friction fit, and provides either a horizontal or near horizontal marked surface, or a vertically extended skirt-like surface, carrying the markings on its outer side. The ring element can extend well below the member 10 and may be of transparent or translucent material, a light source being then provided on the phonographic source with which the turntable is used, so as to illuminate the element from inside.

Figure 5:
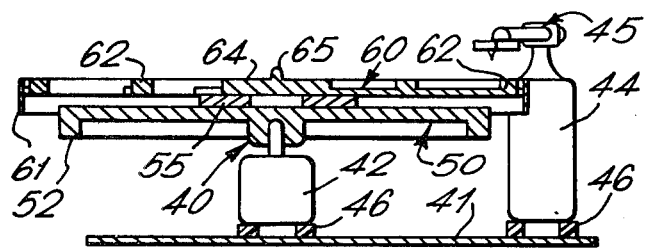
FIG. 5 is a schematic side view partly in section of a phonographic source with a modified turntable and a pick-arm embodying the invention.
Figure 6:
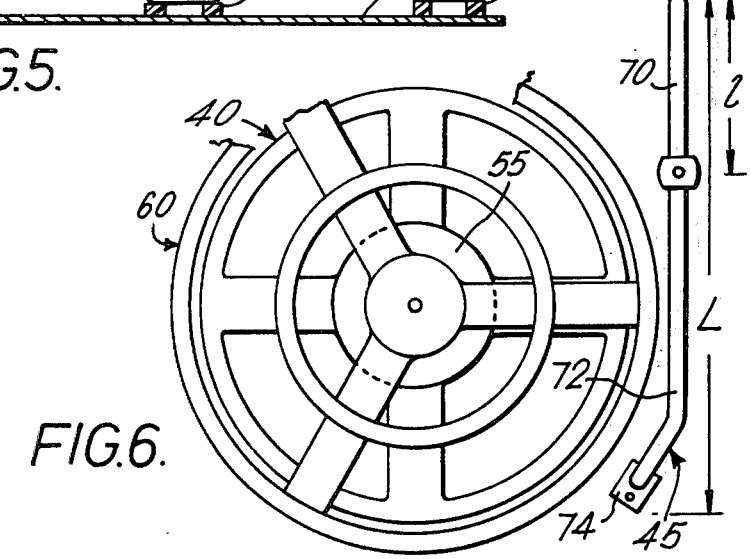
FIG. 6 is a schematic plan view of the phonographic source of FIG. 5.

Another modified form of turntable is shown in FIGS. 5 and 6 of the drawing, which show the turntable 40 as part of a phonographic source or record playing deck. The deck comprises a base board 41 having mounted thereon an electric motor 42 which drivingly supports the turntable 40, and a pick-up arm support 44 which mounts a pick-up arm 45. Preferably, both the pick-up arm support 44 and the electric motor 42 are mounted on the base board 41 by independent vibration resistant means 46.

The electric motor 42 may be of any suitable kind, for example, it may be a synchronous motor powered from a variable frequency oscillator, under the control of a control module (not shown) which permits the user to adjust the frequency of the output to the motor so as to obtain a desired rotational speed. Such a control module can be mounted on the base board 41 or separately therefrom at any convenient position, as the connection between it and the motor 42 consists only of a pair of wires.

The motor 42 is mounted on the base board so that the axis of its drive shaft extends accurately vertically in use, with the upper end protruding from the motor casing. On this protruding end there is received the turntable 40 which comprises a lower, flywheel, member 50 and an upper support member 60. The lower member 50 has the same general form as the flywheel member 10 of FIGS. 1 and 2, with a heavy outer ring 52, but is of lesser diameter than the upper member 60 which carries, preferably detachably, at its outer periphery a skirt 61 with stroboscopic markings. The upper member 60 again provides annular support members 62, a central support portion 64 and a spindle 65. The turntable differs from that of FIGS. 3 and 4 mainly in that there is provided an annular connecting member 55 concentrically between the upper and lower members 50 and 60, thereby further lengthening the path for vibrations from the motor drive shaft to a record supported on the member 60.

The connection between the upper and lower members can be further radially spaced from the centre if desired, and can be effected at a plurality of spaced positions instead of by an annular member. The connection to the drive shaft can be similarly spaced from the record supporting surfaces in the turntable of FIGS. 1 and 2, by the provision of an underlying support member for engagement with the drive shaft.

In accordance with the invention, the pick-up arm 45 has a portion 70 extending from a pivot position 71 in the opposite direction away from a portion 72 supporting a cartridge 74. The length l of the portion 70 is at least one third of the total arm length L. The portion 70 functions to counter-balance the weight of the portion 70, and is preferably shaped as far as possible in such a manner as to compensate to the greatest possible degree for the effect of externally imposed vibrations on the pick-up arm, other than those due to the contact of the stylus with a record being played. The arm 45 can of course incorporate means for adjusting the effective counter-balance weight, together with means for mechanically lifting and lowering the arm. Like the counter-balance portion 70 and the rest of the arm, such additional elements are shaped and constructed so as to have resonant frequencies lying outside the audio frequency range.

Figure 2:
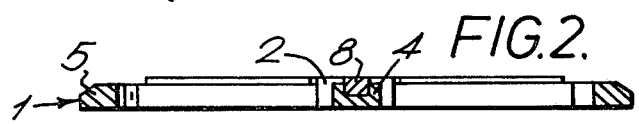
FIG. 2 is a sectional side view of the turntable of FIG. 1, taken on the line II—II of FIG. 1.

It will be evident that the turntable of the invention can be embodied in a variety of ways, and certain features of the three embodiments can be interchanged: for example, the turntable of FIGS. 1 and 2 can be provided with annular support members similar to those of FIGS. 3 and 4.

It will be evident that the pick-up arm of the invention can be embodied in a wide variety of constructions; ideally the structure of the two portions on either side of the pivot position should be identical, but because of space limitations, a shorter portion as illustrated may be preferred.

The phonographic source will be completed by housing elements (not shown) which provide upper deck surfaces around the turntable, and between it and the pick-up arm mounting. Such housing elements are constructed to be as nearly as possible acoustically dead, and to have resonant frequencies outside the audio frequency range.

I claim:

1. A phonographic turntable comprising flywheel means, said flywheel means comprising hub means adapted to receive a rotational drive; record supporting means comprising a central portion providing a central record supporting surface, pin means upstanding from the central portion for reception in a phonograph record center hole, outer support means providing record supporting surfaces outwardly of said central record supporting surface, and a plurality of first arm means connecting together said central portion and said outer support means and exposing the ambient acoustic pressure a major portion of the underside of a phonographic record received on said supporting surfaces, and connecting means connecting together said flywheel means and said record supporting means, said flywheel means comprising a peripheral portion and a plurality of second spaced arm means connecting said hub means to said peripheral portion and exposing to ambient acoustic pressure a major portion of the underside of a phonographic record received on said supporting surfaces, said peripheral portion weighing more than said hub means and said second arm means together.

2. A turntable as claimed in claim 1, wherein said connecting means extends between only the central region of said flywheel means and said record supporting means.

3. A turntable as claimed in claim 2, wherein said connecting means is an annular member.

* * * * *